(12) United States Patent
de Vries et al.

(10) Patent No.: US 7,451,196 B1
(45) Date of Patent: Nov. 11, 2008

(54) METHOD AND SYSTEM FOR EXECUTING A SOFTWARE APPLICATION IN A VIRTUAL ENVIRONMENT

(75) Inventors: Jeffrey de Vries, Sunnyvale, CA (US); Gregory Zavertnik, San Jose, CA (US)

(73) Assignee: Stream Theory, Inc., Irvine, CA (US)

( * ) Notice: Subject to any disclaimer, the term of this patent is extended or adjusted under 35 U.S.C. 154(b) by 472 days.

(21) Appl. No.: 10/023,915

(22) Filed: Dec. 14, 2001

Related U.S. Application Data

(60) Provisional application No. 60/256,082, filed on Dec. 15, 2000.

(51) Int. Cl.
*G06F 15/177* (2006.01)
*G06F 15/16* (2006.01)

(52) U.S. Cl. ..................... 709/220; 709/250
(58) Field of Classification Search ............... None
See application file for complete search history.

(56) References Cited

U.S. PATENT DOCUMENTS

| | | | |
|---|---|---|---|
| 4,796,220 A | 1/1989 | Wolfe | |
| 5,063,500 A | 11/1991 | Shorter | |
| 5,109,413 A | 4/1992 | Comeford et al. | |
| 5,210,850 A | 5/1993 | Kelly et al. | |
| 5,293,556 A | 3/1994 | Hill et al. | |
| 5,442,791 A | 8/1995 | Wrabetz et al. | |
| 5,495,411 A | 2/1996 | Ananda | |
| 5,548,645 A * | 8/1996 | Ananda | 705/52 |
| 5,666,293 A | 9/1997 | Metz et al. | |
| 5,696,965 A | 12/1997 | Dedrick | |
| 5,701,427 A | 12/1997 | Lathrop | |
| 5,706,440 A | 1/1998 | Compliment et al. | |
| 5,715,403 A | 2/1998 | Stefik | |
| 5,764,906 A | 6/1998 | Edelstein et al. | |

(Continued)

FOREIGN PATENT DOCUMENTS

| | | |
|---|---|---|
| WO | WO 2006/022745 A2 | 3/2006 |
| WO | WO 2006/047133 A2 | 5/2006 |
| WO | WO 2006/055445 A2 | 5/2006 |

OTHER PUBLICATIONS

Faupel, Status of Industry Work on Signed Mobile Code, Joint European Networking Conference (JENC), May 1997 . 313-1-313-8.

(Continued)

*Primary Examiner*—John B. Walsh
(74) *Attorney, Agent, or Firm*—Perkins Coie LLC

(57) ABSTRACT

Method and system for executing a software application in a virtual environment includes a file system hook operatively interposed between a file system manager and a file system driver of the local computer, the file system hook configured to detect a file system call corresponding to a target program and to perform one or more procedures, and an agent procedure executing on the local computer to configure the file system hook for executing the target program. Also provided is a token file corresponding to the target program, the token file including file system overlay information for the target program. The one or more procedures may include accessing data at a server terminal operatively coupled to the local computer via a data network, or at a locally connected CD-ROM drive. Numerous other aspects are provided.

9 Claims, 4 Drawing Sheets

U.S. PATENT DOCUMENTS

| | | | |
|---|---|---|---|
| 5,778,395 A | 7/1998 | Whiting et al. | |
| 5,805,809 A | 9/1998 | Singh et al. | |
| 5,809,144 A | 9/1998 | Sirbu et al. | |
| 5,822,537 A | 10/1998 | Katseff et al. | |
| 5,835,722 A | 11/1998 | Bradshaw et al. | |
| 5,838,910 A | 11/1998 | Domenikos et al. | |
| 5,878,425 A | 3/1999 | Redpath | |
| 5,881,229 A * | 3/1999 | Singh et al. | 709/203 |
| 5,881,232 A | 3/1999 | Cheng et al. | |
| 5,892,915 A | 4/1999 | Duso et al. | |
| 5,895,454 A | 4/1999 | Harrington | |
| 5,903,721 A | 5/1999 | Sixtus | |
| 5,903,732 A | 5/1999 | Reed et al. | |
| 5,903,892 A | 5/1999 | Hoffert et al. | |
| 5,905,868 A | 5/1999 | Baghai et al. | |
| 5,909,545 A | 6/1999 | Frese et al. | |
| 5,911,043 A | 6/1999 | Duffy et al. | |
| 5,918,015 A | 6/1999 | Suzuki et al. | |
| 5,923,885 A | 7/1999 | Johnson | |
| 5,933,603 A | 8/1999 | Vahalia et al. | |
| 5,933,822 A | 8/1999 | Braden-Harder et al. | |
| 5,943,424 A | 8/1999 | Berger et al. | |
| 5,948,062 A | 9/1999 | Tzelnic et al. | |
| 5,948,065 A | 9/1999 | Eilert et al. | |
| 5,949,877 A | 9/1999 | Traw et al. | |
| 5,953,506 A | 9/1999 | Kalra et al. | |
| 5,960,411 A | 9/1999 | Hartman et al. | |
| 5,963,944 A | 10/1999 | Admas | |
| 5,973,696 A | 10/1999 | Agranat et al. | |
| 5,987,454 A | 11/1999 | Hobbs | |
| 6,014,686 A | 1/2000 | Elnozahy et al. | |
| 6,018,619 A | 1/2000 | Allrad et al. | |
| 6,026,166 A | 2/2000 | LeBourgeois | |
| 6,028,925 A | 2/2000 | Van Berkum et al. | |
| 6,038,379 A | 3/2000 | Fletcher et al. | |
| 6,038,610 A | 3/2000 | Belfiore et al. | |
| 6,047,323 A | 4/2000 | Krause | |
| 6,061,738 A | 5/2000 | Osaku et al. | |
| 6,065,043 A | 5/2000 | Domenikos et al. | |
| 6,081,842 A | 6/2000 | Shachar et al. | |
| 6,085,186 A | 7/2000 | Christianson et al. | |
| 6,085,193 A | 7/2000 | Malkin et al. | |
| 6,088,705 A | 7/2000 | Lightstone | |
| 6,094,649 A | 7/2000 | Bowen et al. | |
| 6,099,408 A | 8/2000 | Schneier et al. | |
| 6,101,482 A | 8/2000 | DiAngelo et al. | |
| 6,101,491 A | 8/2000 | Woods | |
| 6,108,420 A * | 8/2000 | Larose et al. | 705/59 |
| 6,138,271 A | 10/2000 | Keeley | |
| 6,154,878 A | 11/2000 | Saboff | |
| 6,157,948 A | 12/2000 | Inoue et al. | |
| 6,185,608 B1 | 2/2001 | Hon et al. | |
| 6,192,398 B1 | 2/2001 | Hunt et al. | |
| 6,192,408 B1 | 2/2001 | Vahalia et al. | |
| 6,195,694 B1 * | 2/2001 | Chen et al. | 709/220 |
| 6,219,693 B1 | 4/2001 | Napolitano et al. | |
| 6,226,665 B1 | 5/2001 | Deo et al. | |
| 6,253,234 B1 | 6/2001 | Hunt et al. | |
| 6,275,496 B1 | 8/2001 | Burns et al. | |
| 6,278,992 B1 | 8/2001 | Curtis et al. | |
| 6,282,712 B1 | 8/2001 | Davis et al. | |
| 6,298,356 B1 | 10/2001 | Jawahar et al. | |
| 6,301,605 B1 | 10/2001 | Napolitano et al. | |
| 6,311,221 B1 | 10/2001 | Raz et al. | |
| 6,330,561 B1 | 12/2001 | Cohen et al. | |
| 6,347,398 B1 | 2/2002 | Parthasarathy et al. | |
| 6,356,946 B1 | 3/2002 | Clegg et al. | |
| 6,370,686 B1 | 4/2002 | Delo et al. | |
| 6,374,402 B1 | 4/2002 | Schmeidler et al. | |
| 6,418,554 B1 | 7/2002 | Delo et al. | |
| 6,418,555 B2 | 7/2002 | Mohammed | |
| 6,449,688 B1 | 9/2002 | Peters et al. | |
| 6,453,334 B1 | 9/2002 | Vinson et al. | |
| 6,457,076 B1 | 9/2002 | Cheng et al. | |
| 6,510,458 B1 | 1/2003 | Berstis et al. | |
| 6,510,462 B2 | 1/2003 | Blumenau | |
| 6,510,466 B1 | 1/2003 | Cox et al. | |
| 6,574,618 B2 | 6/2003 | Eylon et al. | |
| 6,584,507 B1 | 6/2003 | Bradley et al. | |
| 6,587,857 B1 | 7/2003 | Carothers et al. | |
| 6,598,125 B2 | 7/2003 | Romm | |
| 6,601,103 B1 | 7/2003 | Goldschmidt Iki et al. | |
| 6,601,110 B2 | 7/2003 | Marsland | |
| 6,609,114 B1 | 8/2003 | Gressel et al. | |
| 6,622,137 B1 | 9/2003 | Ravid et al. | |
| 6,622,171 B2 | 9/2003 | Gupta et al. | |
| 6,636,961 B1 | 10/2003 | Braun et al. | |
| 6,687,745 B1 | 2/2004 | Franco et al. | |
| 6,694,510 B1 | 2/2004 | Williems | |
| 6,697,869 B1 | 2/2004 | Mallart et al. | |
| 6,711,619 B1 | 3/2004 | Chanderamohan et al. | |
| 6,735,631 B1 | 5/2004 | Oekrke et al. | |
| 6,757,708 B1 | 6/2004 | Craig et al. | |
| 6,757,894 B2 | 6/2004 | Eylon et al. | |
| 6,763,370 B1 | 7/2004 | Schmeidler et al. | |
| 6,772,209 B1 | 8/2004 | Chernock et al. | |
| 6,779,179 B1 | 8/2004 | Romm et al. | |
| 6,785,768 B2 | 8/2004 | Peters et al. | |
| 6,810,525 B1 | 10/2004 | Safadi et al. | |
| 6,816,909 B1 | 11/2004 | Chang et al. | |
| 6,832,222 B1 | 12/2004 | Zimowski | |
| 6,836,794 B1 | 12/2004 | Lucowsky et al. | |
| 6,854,009 B1 | 2/2005 | Hughes | |
| 6,918,113 B2 | 7/2005 | Patel et al. | |
| 6,925,495 B2 | 8/2005 | Hegde et al. | |
| 6,938,096 B1 | 8/2005 | Greschler et al. | |
| 6,959,320 B2 | 10/2005 | Shah et al. | |
| 7,028,305 B2 | 4/2006 | Schaefer et al. | |
| 7,043,524 B2 | 5/2006 | Shah et al. | |
| 7,051,315 B2 | 5/2006 | Artiz et al. | |
| 7,062,567 B2 | 6/2006 | Benitez et al. | |
| 2001/0037399 A1 | 11/2001 | Eylon et al. | |
| 2001/0037400 A1 | 11/2001 | Raz et al. | |
| 2001/0044850 A1 | 11/2001 | Raz et al. | |
| 2002/0019864 A1 | 2/2002 | Mayer | |
| 2002/0042833 A1 | 4/2002 | Hendler et al. | |
| 2002/0078170 A1 | 6/2002 | Brewer et al. | |
| 2002/0078203 A1 | 6/2002 | Greschler et al. | |
| 2002/0083183 A1 | 6/2002 | Pujare et al. | |
| 2002/0083187 A1 | 6/2002 | Sim et al. | |
| 2002/0087717 A1 | 7/2002 | Artzi et al. | |
| 2002/0087883 A1 | 7/2002 | Wohlgemuth et al. | |
| 2002/0091763 A1 | 7/2002 | Shah et al. | |
| 2002/0138640 A1 | 9/2002 | Raz et al. | |
| 2002/0156911 A1 | 10/2002 | Croman et al. | |
| 2002/0157089 A1 | 10/2002 | Patel et al. | |
| 2002/0161908 A1 | 10/2002 | Benitez et al. | |
| 2002/0174215 A1 | 11/2002 | Schaefer | |
| 2003/0004882 A1 | 1/2003 | Holler et al. | |
| 2003/0009538 A1 | 1/2003 | Shah et al. | |
| 2003/0056112 A1 | 3/2003 | Vinson et al. | |
| 2003/0140160 A1 | 7/2003 | Raz et al. | |
| 2004/0230971 A1 | 11/2004 | Rachman et al. | |
| 2004/0268361 A1 | 12/2004 | Schaefer | |
| 2005/0010670 A1 | 1/2005 | Greschler et al. | |
| 2005/0193139 A1 | 9/2005 | Vinson et al. | |
| 2006/0048136 A1 | 3/2006 | De Vries et al. | |
| 2006/0106770 A1 | 5/2006 | De Vries et al. | |
| 2006/0123185 A1 | 6/2006 | De Vries et al. | |
| 2006/0136389 A1 | 6/2006 | Cover et al. | |

OTHER PUBLICATIONS

Mullender et al, Amoeba: A Distributed Operating System for the 1990s, Computer Magazine, May 1990, 44-53, 23(5).

Pyarali et al, Design and Performance of an Object-Oriented Framework for High-Speed Electronic Medical Imaging, Fall 1996, Computing Systems Journal, 331-375, vol. 9 No. 4, USENIX, retrieved online on Jun. 15, 2006 at http://www.cs.wustl.edu/~schmidt/PDF/COOTS-96.pdf.

Reinhardt, Robert B., An Architectural Overview of UNIX Network Security, ARINC Research Corporation, Sep. 19, 1992, retrieved online on Jun. 15, 2006 at http://www.clusit.it/whitepapers/unixnet.pdf.

Tardo & Valente, Mobile Agent Security and Telescript, 4th International Conference of the IEEE Computer Society (IEEE CompCon1996), Feb. 1996.

Microsoft, "Understanding Universal Plug and Play", pp. 1-39, Feb. 6, 2000.

\* cited by examiner

METHOD AND SYSTEM FOR EXECUTING A SOFTWARE APPLICATION IN A VIRTUAL ENVIRONMENT

RELATED APPLICATION

The present application claims priority under 35 USC §119 to provisional application No. 60/256,082 entitled "Method and System for Executing a Software Application in a Virtual Environment" with named inventors Jeffrey de Vries and Gregory Zavertnik, filed on Dec. 15, 2000, the disclosure of which is incorporated by reference in its entirety for all purposes.

FIELD OF THE INVENTION

The present invention relates to a method and system for executing software applications. More particularly, the present invention relates to a method and system for executing software applications that operate in a virtual environment generated using, for example, file system and registry hooks and overlays.

BACKGROUND OF THE INVENTION

With the popularity and wide access of broadband networks, software publishers have made applications available for use on central servers. Indeed, a commercial market segment known as Application Service Providers (ASPs) has recently emerged. Broadband network access facilitates the use (including downloading and execution) of such server-based software applications by providing high speed data connections for distribution of software applications from a server terminal (or from a remote location) to a local client terminal (for example, a personal computer terminal). However, many users consider it troublesome and time consuming to install applications distributed in this manner onto their client terminals because it typically requires accessing the server terminal via the data connection, downloading the desired application, and thereafter installing the downloaded application onto the client terminal for execution.

In view of the foregoing, it is desirable to have a system and method that provides unobtrusive execution of externally delivered applications, without the traditional installation procedure of the application before execution. It is further desired to have secure access to the applications to prevent unauthorized users from executing them.

SUMMARY OF THE INVENTION

In view of the foregoing, in one aspect of the present invention, a system for providing a file system overlay on a local computer includes a file system hook operatively interposed between a file system manager and a file system driver of the local computer, the file system hook configured to detect a file system call corresponding to a target program and to perform one or more procedures, and an agent procedure executing on the local computer to configure the file system hook for executing the target program. The one or more procedures may include accessing data at a server terminal operatively coupled to the local computer via a data network, or at a locally connected CD-ROM drive.

The system further includes a token file corresponding to the target program, the token file including file system overlay information for the target program, where the token file may also include information corresponding to one or more registry overlays, and environment variable changes. The token file may also have a unique file extension for use by the local computer operating system.

In one aspect, the target program may be associated with a unique process identifier, where process identifier is generated by the operating system of the local computer.

A method of providing a file system overlay on a local computer in accordance with another embodiment of the present invention includes the steps of configuring a file system hook operatively interposed between a file system manager and a file system driver of the local computer, to detect a file system call corresponding to a target program, and to perform one or more procedures, and executing an agent procedure on the local computer for configuring the file system hook to execute the target program.

The method in yet another aspect may further include a token file corresponding to the target program, the token file including file system overlay information for the target program.

A computer program product of still another embodiment includes a medium readable by a computer, the computer readable medium having computer program code adapted to configure a file system hook operatively interposed between a file system manager and a file system driver of the local computer, to detect a file system call corresponding to a target program, and to perform one or more procedures, and execute an agent procedure on the local computer for configuring the file system hook to execute the target program. Further, the computer program product may include a token file corresponding to the target program, the token file including file system overlay information for the target program.

In the manner described above, in accordance with the various embodiments of the present invention, there is provided a system and method that provides unobtrusive execution of externally delivered applications, without the traditional installation procedure of the application before execution by employing file system and registry overlays that generate the appearance of having installed the application without actually modifying the underlying file system or registry.

Numerous other aspects are provided, as are methods and computer program products. Each inventive computer program product may be carried by a medium readable by a computer (e.g., a carrier wave signal, a floppy disk, a hard drive, a random access memory, etc.). A computer readable storage medium encompasses physical mediums (floppy disk, a hard drive, a random access memory, etc.) but does not include non-physical media (i.e. carrier wave signal).

These and other features and advantages of the present invention will be understood upon consideration of the following detailed description of the invention and the accompanying drawings.

DETAILED DESCRIPTION OF THE INVENTION

In accordance with the present invention, a virtual environment is created on a client terminal such that application programs (typically delivered via a broadband computer network, or a local CD-ROM drive) may be efficiently and properly executed without being installed on the client terminal. The environment in which the application executes is not entirely virtual, however, and may be considered an overlay of a virtual environment over an existing "actual" environment. Indeed, in accordance with the present invention, file system and registry hooks are configured to provide a virtual environment that simulates a client terminal's operating environment, but with the addition of file system and registry overlays which provide the appearance of the target program being installed. The file system and registry hooks are also configured to permit access to the computer's virtual operating environment only by designated computer processes. Other programs only see the real environment, not the virtual environment.

Figure 1:
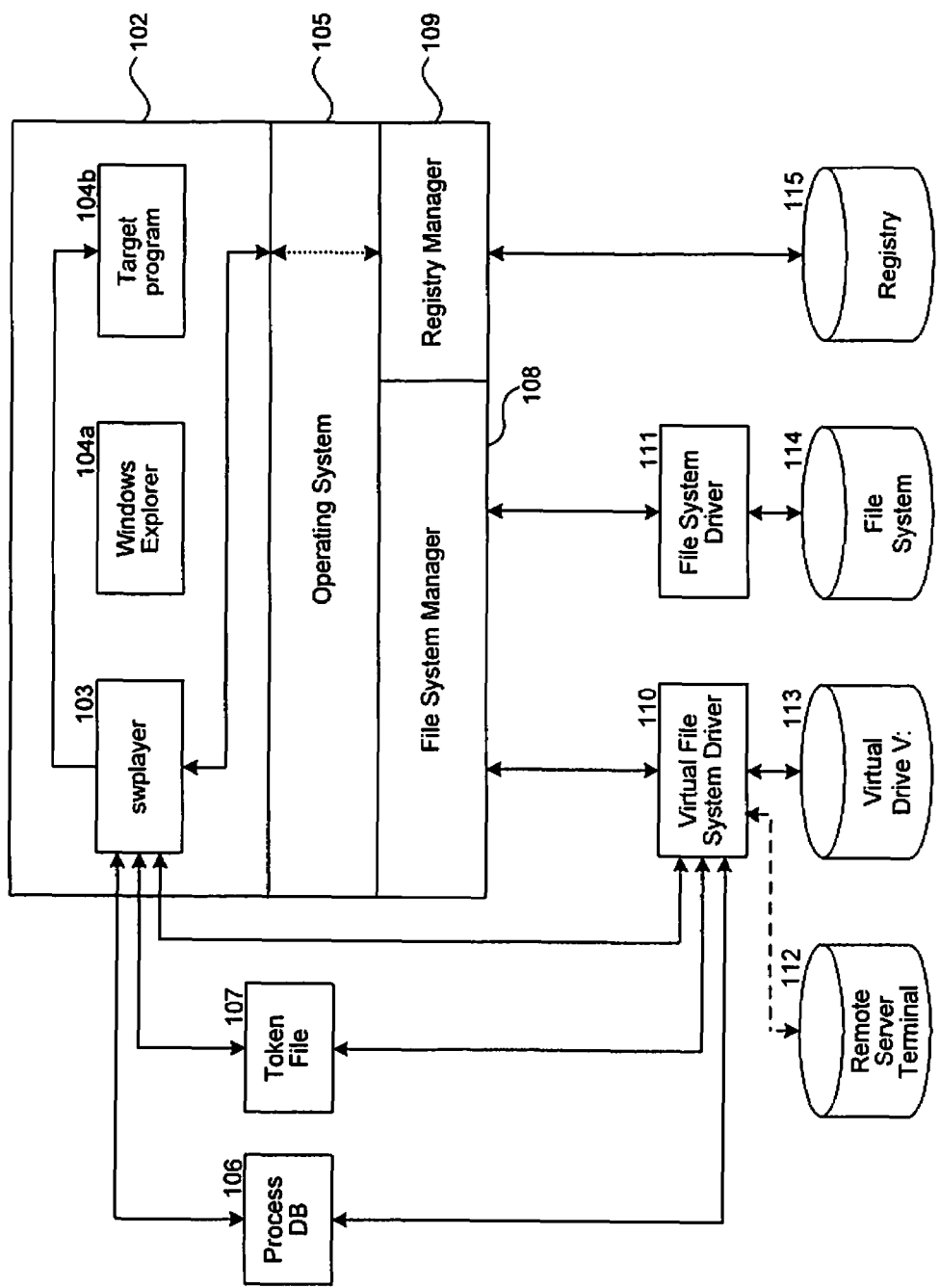
FIG. 1 illustrates a software application execution environment at a client terminal.

FIG. 1 illustrates a software application execution environment at a client terminal. Referring to the Figure, the software application execution environment includes a client terminal 102 for installing therein application programs such as Microsoft Windows Explorer 104a and a target application program 104b. In one configuration, the application programs 104a, 104b interact with a "raw" file system 114 (for example, stored in a hard drive of the client terminal) via an operating system 105 such as the various generations of Windows operating system commercially available from Microsoft Corporation. In turn, the operating system 105 is configured to interact with the file system 114 via a file system manager 108 and file system driver 111.

For example, the operating system 105 may be configured to translate file system access requests from an application program such as the Windows Explorer 104a into a file system call. The file system call is directed by the file system manager 108 to the appropriate file system driver 111, and, thus, eventually to the appropriate file system 114. Further, a registry manager 109 is configured to handle calls to a registry 115 (such as the Windows registry in the case of the Windows operating system) from the application programs 104a, 104b.

The software application execution environment of FIG. 1 further includes a virtual file system driver 110 which creates a virtual drive 113 using a token file 107 that contains a description of the contents of the virtual drive 113. In one aspect, the virtual file system driver 110 uses a process database 106 (maintained by an agent procedure/routine such as a client agent swplayer 103) to gate access to the virtual drive 113 based on predetermined criteria of the requesting process. The client agent swplayer 103 also uses the contents of the token file 107 to modify the registry 115. The virtual file system driver 110 retrieves the actual contents of the files from either a remotely located server terminal 112 or local CD-ROM drive, etc. Moreover, the virtual file system driver 110 also maintains a local cache (not shown). In this manner, a target application program which is not installed on a client terminal 102 may be run via a virtual drive letter (for example, drive "V") and registry modification. Additional detailed description related to execution of a target application program on a client terminal via a virtual driver letter and registry modification may be found in pending application Ser. No. 09/098,075 filed on Jun. 16, 1998 entitled "Method and Apparatus to Allow Remotely Located Computer Programs and/or data to be Accessed on a Local Computer in a Secure, Time-Limited Manner, with Persistent Caching", the disclosure of which is incorporated in its entirety by reference.

Figure 2:
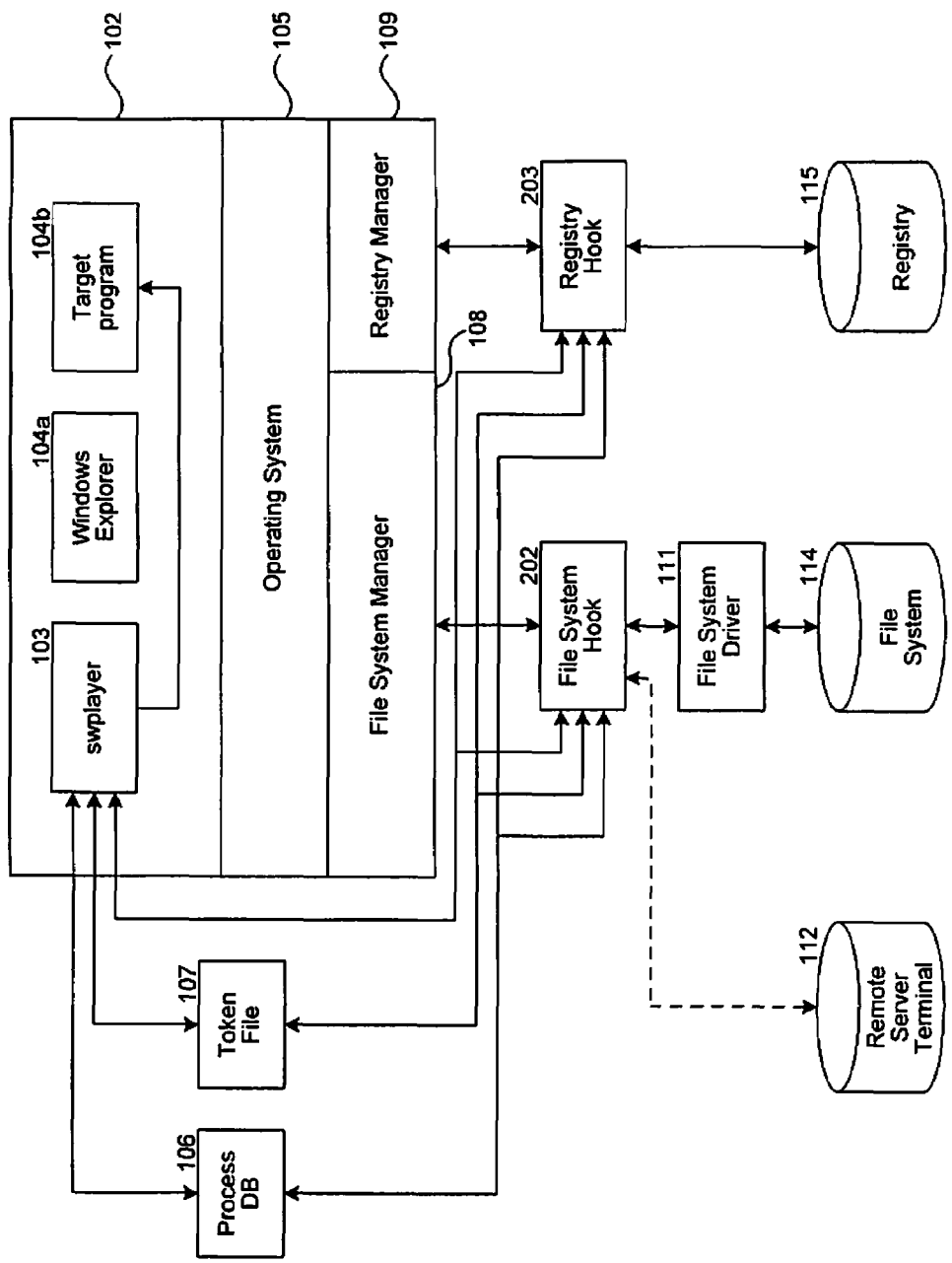
FIG. 2 illustrates a software application execution environment at a client terminal in accordance with one embodiment of the present invention.

FIG. 2 illustrates a software application execution environment at a client terminal in accordance with one embodiment of the present invention. Where a component of FIG. 2 corresponds to a component in FIG. 1, the corresponding reference numeral from FIG. 1 is employed. Referring to FIG. 2, the client agent swplayer 103 is employed to modify the client terminal 102 environment for executing a target program 104b without installing it. In particular, the client agent swplayer 103 configures a file system hook 202 to intercept file system calls from the file system manager 108. In this way, by presenting a view of the existing file system 114 augmented with a file system overlay generated from data in the token file 107, the target program (as determined by the process database 106) can be executed correctly.

More specifically, a chain of file system hooks is interposed between the file system manager 108 and the file system driver 111. The file system hooks take control of the file system calls before a file system driver 111 is called to perform the function corresponding to the file system call. The file system hooks receive the same information as the file system driver 111. When called, the file system hooks can perform one of four operations. First, the file system hook may ignore the call and chain onto the next file system hook in the hook chain. Second, the file system hook may process the call and return directly to the file system manager 108. Third, the file system hook may change the call or make multiple calls to the file system driver 111 directly, and then return to the file system manager 108. Lastly, the file system hook may call down the hook chain and perform additional processing on the way back.

Referring back to FIG. 2, the client agent swplayer 103 informs the file system hook 202 via the process database 106 about the executing target program 104b using the process identification assigned by the operating system 105. The client agent swplayer 103 also informs the file system hook 202 about the token file 107 which contains the file system paths and files (i.e. the overlay, which is essentially a private file system, since the file system hook 202 will only allow the target program 104b to see them) through which files/chunks of the target program can be retrieved 112. In one embodiment, this configuration of the file system hook 202 is implemented by the client agent swplayer 103 modifying the process database 106 to which both the client agent swplayer 103 and the file system hook 202 have access, and based on the content of which the file system hook 202 executes.

By way of illustration, the process database 106 shown in FIG. 2 may be modified such that the file system hook 202 recognizes file system access requests from the executing target program 104b to access information and file and directory structure in the overlay, and data indirectly from the server terminal 112. For example, the file system hook 202 may be configured to access the server terminal 112 (which holds files or portions of files containing data and program instructions, including the target program 104b itself) on behalf of the target program 104b by a network file system driver via a broadband network (not shown). As another example (not illustrated), the network file system driver may instead be a CD-ROM file system driver that accesses files or portions of files from a CD-ROM drive that is connected locally to the client terminal, where the file system hook 202 is configured to retrieve data on behalf of the target program 104b from the CD-ROM file system driver.

Taking the specific example illustrated in FIG. 2, because the file system hook 202 is configured to grant visibility of the overlay (as contained in the token file 107) only to the target program 104b (more specifically, only to a process having the process ID of the target program 104b), any other program attempting to see information in the overlay will not be able to do so via the file system hook 202. For example, if a user attempts to use the installed application program, such as the Windows Explorer 104a, to view the directory structure of the local computer, a file system call corresponding to the request will be generated by the operating system 105. However, because the file system hook 202 is not configured to grant visibility of the overlay other than to the target program 104b, the file system call will be passed by the file system hook 202 onto the file system driver 111, which will return the view of the local computer directory without the overlay information.

It is recognized that the target program 104b may itself spawn other processes (i.e., the operating system 105 may spawn other processes based on the execution of the target program 104b) for which it will be necessary to allow access to the file system overlay and private file storage. In one embodiment, the client agent swplayer 103 is configured to monitor any spawning processes and to modify the process database 106 to recognize the spawned processes. Alternatively, when the file system hook 202 is configured to recognize a particular process ID for which a file system access request has been made, the file system hook 202 "walks" the process activation/hierarchy tree for the processes for which it has been configured. If the non-recognized process is found, then the file system hook 202 handles the file system access request and may modify its configuration (e.g., by modifying the process database 106) to recognize the previously non-recognized process.

In accordance with one embodiment, the file system hook 202 maintains a negative table of processes IDs that it is configured not to handle. To determine if a process is one for which the file system hook 202 is configured to handle, the file system hook 202 first checks against the negative table. If the process ID appears in the negative table, there is no need to then "walk" the process activation/hierarchy tree of the process for which the file system hook 202 is configured to handle to determine whether the requesting process is a spawned process which the file system hook 202 should properly handle.

Figure 3:
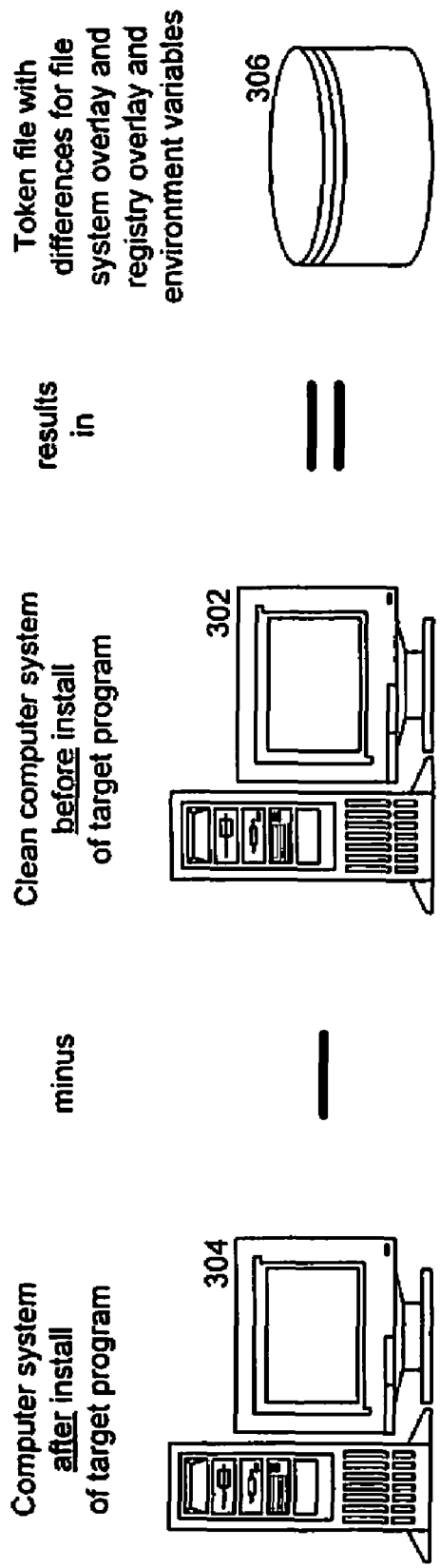
FIG. 3 illustrates the process for generating a token file.

FIG. 3 illustrates the process for generating a token file. Referring to the Figure, during a preprocessing phase, the state of a "clean" computer terminal 302 is recorded. Then, the target program is installed onto the clean computer terminal 302, resulting in the computer terminal 304. The state of the computer 304 is compared to the state of the computer terminal 302, and the difference is recorded as the token file 306. For example, in the context of a Windows operating system environment, the token file 306 may indicate the differences in registry settings, in environment variables, in file properties (file size, last modification time, etc.) and in the overall directory structure. The differences in file system and registry are recorded as overlays within the token file 306. In one embodiment, the token file 306 may also include information related to registry overlays, and environment variable changes created by an actual installation of the target program.

It should be noted that the target program 104b may be considered a manifestation of executing instructions pointed to by the token file 306 in an environment represented by the token file 306. To this end, the environment represented by the token file 306 is encoded as overlays for the file system and registry, with other important data such as environment variables, working directory, command line, and so on, as discussed in further detail below. In this manner, a target program not installed on a client terminal may be executed via file system and registry hooks with superimposed overlays.

Furthermore, in another embodiment, in addition to installing the target program 104b on computer terminal 304, the target program 104b may be executed on the computer terminal 304 before deriving the token file 306 so that any final installation steps performed the target program 104b the first time it is run may be captured.

Figure 4:
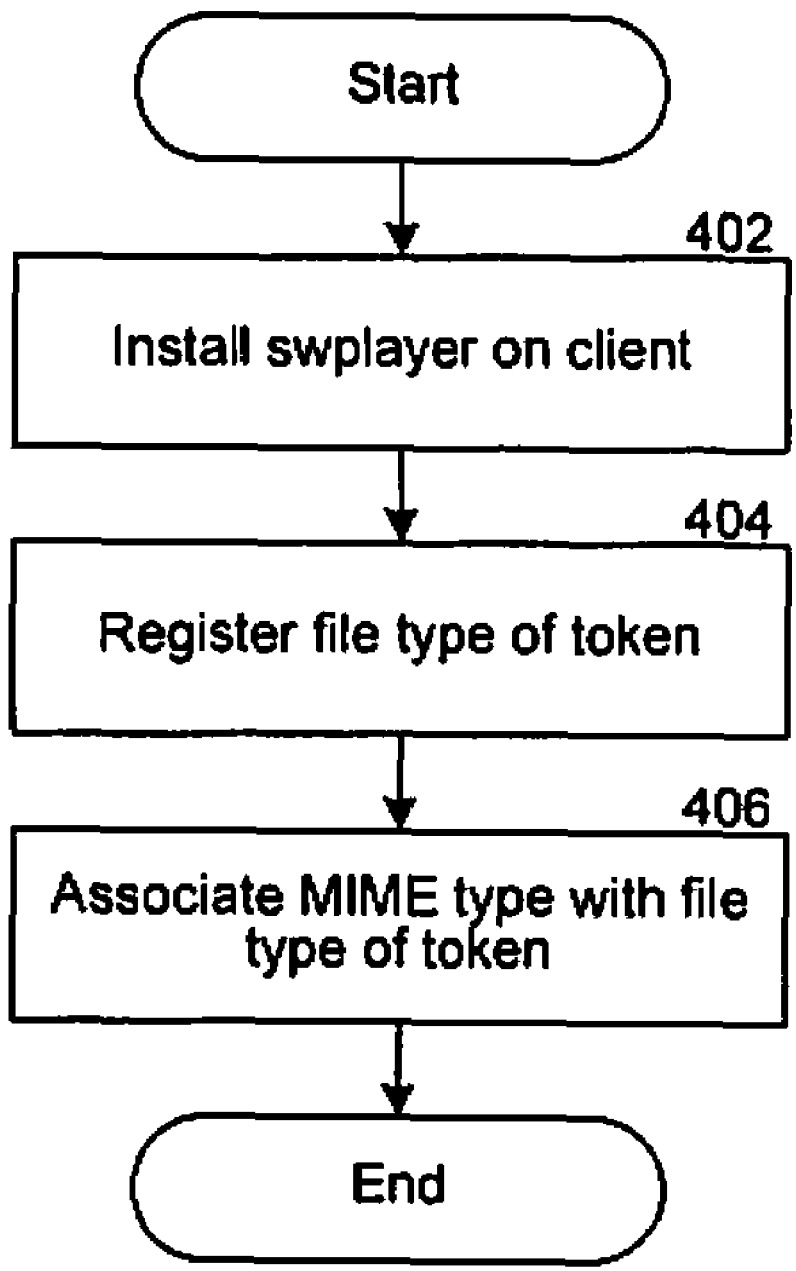
FIG. 4 is a flowchart illustrating a process for setting up a client terminal for using token files.

FIG. 4 is a flowchart illustrating the process for setting up a client terminal for using token files. Referring to FIGS. 2 and 4, at step 402 a "generic" client agent program (e.g., "swplayer") is installed on the client terminal 102. In this context, a "generic" client agent program indicates that the agent program is suitable for executing any target application program so long as the appropriate associated token file is provided. Thereafter at step 404, a new file type is registered with the Windows Explorer application 104a for token files, for example, in the Windows operating system environment. The token files thus have a unique file extension used exclusively by client agent swplayer 103. By modifying the Windows registry settings to associate this unique file extension with client agent swplayer 103, whenever a token file (with the given extension) is opened, client agent swplayer 103 is started and the token file is supplied as a command line argument to client agent swplayer 103.

Referring back to FIG. 4, at step 406, a new MIME (Multipurpose Internet Mail Extensions) type is associated with the extension of the token file such that when an internet browser (such as the Internet Explorer application) is used to link to a token file referenced in a web page, the web browser causes the token file to download to the client terminal, causes the client agent swplayer 103 to be started, and passes the token file location to the client agent swplayer 103.

A user may use the web browser to navigate to a web site, and click on a link indicating a target program listed on a web page. The link points to the token file for that target program. The web browser initiates retrieval of the token file, and, based on the MIME type for the token file, recognizes that the token file should be downloaded to the client terminal, and the client agent swplayer 103 is started with the location of the token file given as an argument to the client agent swplayer 103. The web browser downloads the token file, and starts the client agent swplayer 103. The location of the token file that was downloaded is provided to the client agent swplayer 103 when the client agent swplayer 103 is started.

Optionally, once a token file has been downloaded to the client terminal, the user may bypass accessing the web site and selecting the link for the target program, and rather, directly open the token file already present on the client terminal. Since the token file's file extension was registered with the operating system (for e.g., using Windows Explorer 104a), opening the token file will cause client agent swplayer 103 to be started with the location of the token file given as an argument to client agent swplayer 103. Alternatively, the token file (and the target program component files) may already be local to the client terminal 102, for example, on the hard drive or on the CD-ROM drive.

Once the client agent swplayer 103 is started, it reads parameters from the token file 107 to modify the process database 106 as appropriate, including causing the operating system 105 to create a process ID (PID) under which the target program 104b operates and based on which the file system hook 202 monitors and controls interaction with files necessary to run the target program 104b. That is, the file system hook 202 monitors file system calls as discussed above, i.e., gating access to the private file system overlay only to programs allowed by the process database 106.

As for registry calls by the executing target program 104b, the client agent swplayer 103 uses the registry overlay information in the token file 107 to configure the registry hook 203 that sees all registry calls before the native registry manager 109. Depending on the registry overlay information in the token file 107, the registry hook 203 may handle a particular registry call itself, modify the registry call and pass it along to the native registry manager 109, or pass the registry call along to the native registry manager 109 unmodified. In this way, the registry 115 is handled in a manner analogous to the file system with gated access based on the process database 106 and registry overlay information contained in the token file 107.

One major advantage of using the registry hook 203, as opposed to modifying the registry itself (and then modifying the registry back) is that if an error is returned during the execution of the target program 104*b* and, for example, the client terminal 102 crashes, then the registry 115 has not been irreparably corrupted.

As discussed in detail above, the present invention provides a system by which a client terminal may robustly and reliably execute programs without installing them through the use of file system hooks and overlays. Moreover, while the detailed description set forth above is directed to a client terminal running in an operating system such as a Windows 2000 operating system or its predecessor versions, the various embodiments of the present invention may be applied to other operating systems and computer networks as well as data systems.

The various processes described above including the processes operating in the software application execution environment at a client terminal, generating a token file, and the process for setting up a client terminal for processing token files, respectively described in conjunction with FIGS. 2-4, may be embodied as computer programs developed using an object oriented language that allows the modeling of complex systems with modular objects to create abstractions that are representative of real world, physical objects and their interrelationships. The software required to carry out the inventive process, which may be stored in the client terminal, may be developed by a person of ordinary skill in the art and may include one or more computer program products.

Indeed, the various embodiments of the present invention provide a method and apparatus for allowing a computer program (potentially remotely-located) to be accessed and executed by a local computer terminal without that program having to first be installed. In addition, the program is executed in such a way as to limit the possibility of the program or data being indiscriminately copied and propagated, plus providing time limits on the access to the program or data. Moreover, copies of modified files (or portions thereof) or registry entries in the overlay are maintained in a local cache (e.g., using a persistent writeback caching scheme) located on, for example, in a hard drive (or any other storage device) of the local computer to improve performance of subsequent accesses, as well as storing recently used remote data, and retaining file, directory and registry content for subsequent executions of the target program.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method comprising the steps of:
providing a token file corresponding to a target program, said token file including file system overlay information for a target program;
using a file system hook operatively interposed between a file system and an operating system of a computer;
intercepting, using the system overlay information, local and remote file system calls associated with the target program;
executing an agent procedure on the computer for configuring said file system hook to locally execute the target program without the target program having been locally installed.

2. A system comprising:
a file system embodied in a computer-readable storage medium;
a file system overlay embodied in a computer-readable storage medium, wherein the file system overlay is associated with the file system and, in operation, a locally executing target program;
a file system manager embodied in a computer-readable storage medium, wherein the file system manager is associated with the file system;
a file system hook module embodied in a computer-readable storage medium, wherein, in operation, the file system hook module utilizes a hook to intercept from the file system manager file system calls associated with the target program, and accesses file and directory structure in the file system overlay associated with the locally executing target program, wherein a first subset of file data identified in the file and directory structure are locally available;
a remote server terminal configured to provide data to the file system hook module, wherein, in operation, the file system hook module receives a portion of a second subset of file data identified in the directory structure from the remote server terminal.

3. A system as in claim 2 further including a virtual file system driver associated with a virtual drive, wherein the target program executes via the virtual drive.

4. A system as in claim 2 further including a registry manager associated with a registry, wherein the target program is associated with the registry manager.

5. A system as in claim 4 further including a registry hook module, wherein the registry hook module is configured to intercept a registry call from the registry manager to the registry.

6. A system as in claim 2 wherein the file system hook module is configured to ignore the file system call and chain to a second file system hook.

7. A system as in claim 2 wherein the file system hook module is configured to process the file system call and return to the file system manager.

8. A system as in claim 2 wherein the file system hook module is configured to call down a hook chain.

9. A system as in claim 2, further comprising a file system driver module embodied in a computer-readable storage medium, wherein, in operation, the file system driver module executes file system calls received from the file system manager.

* * * * *